US009992561B2

United States Patent
Chen et al.

(10) Patent No.: US 9,992,561 B2
(45) Date of Patent: Jun. 5, 2018

(54) METHOD AND APPARATUS FOR DETERMINING A ROGUE ONU IN A PON

(71) Applicant: Alcatel Lucent, Boulogne-Billancourt (FR)

(72) Inventors: Xiao Chen, Shanghai (CN); Simiao Xiao, Shanghai (CN); Qingjiang Chang, Shanghai (CN); Kaibin Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/327,712

(22) PCT Filed: Aug. 3, 2015

(86) PCT No.: PCT/IB2015/001547
§ 371 (c)(1),
(2) Date: Jan. 20, 2017

(87) PCT Pub. No.: WO2016/024162
PCT Pub. Date: Feb. 18, 2016

(65) Prior Publication Data
US 2017/0201814 A1    Jul. 13, 2017

(30) Foreign Application Priority Data
Aug. 15, 2014   (CN) .......................... 2014 1 0403806

(51) Int. Cl.
*H04B 10/08* (2006.01)
*H04Q 11/00* (2006.01)
(Continued)

(52) U.S. Cl.
CPC ....... *H04Q 11/0067* (2013.01); *H04B 10/032* (2013.01); *H04Q 11/04* (2013.01); *H04Q 2011/0083* (2013.01)

(58) Field of Classification Search
CPC ............... H04Q 11/0067; H04Q 11/04; H04Q 2011/0083; H04Q 2011/0081;
(Continued)

(56) References Cited

U.S. PATENT DOCUMENTS 7,386,234 B2 * 6/2008 Lee ........................ H04B 10/00
                                                    398/16
7,468,958 B2 * 12/2008 Emery ................ H04B 10/077
                                                   370/241
(Continued)

FOREIGN PATENT DOCUMENTS

CN      102271293 A    12/2011
CN      103036612 A     4/2013
(Continued)

OTHER PUBLICATIONS

International Search Report PCT/ISA/210 for International Application No. PCT/IB2015/001547 dated Jan. 5, 2016.

*Primary Examiner* — Hibret Woldekidan
(74) *Attorney, Agent, or Firm* — Harness, Dickey & Pierce, P.L.C.

(57) ABSTRACT

The present invention provides a method and apparatus for determining a rogue ONU in an OLT of a PON. The method comprises determining an original infected zone based on a first time slot allocation in which each time slot corresponds to one uplink signal of an ONU; determining a new infected zone based on a second time slot allocation in which each time slot corresponds to an uplink signal of an ONU; determining if there is a same ONU in the original infected zone and in the new infected zone to determine rogue ONU candidate, and determining a rogue ONU based on the rogue ONU candidate. The solution disclosed in the present application has the advantages of quick determination of the rogue ONU, no interruption of the normal service and system compatibility etc.

15 Claims, 4 Drawing Sheets

(51) Int. Cl.
*H04B 10/032* (2013.01)
*H04Q 11/04* (2006.01)

(58) Field of Classification Search
CPC .......... H04Q 2011/0079; H04B 10/032; H04B 10/0799; H04B 10/0773; H04B 10/0793; H04B 10/07955; H04B 10/03; H04B 10/07953; H04B 10/272; H04B 10/0795; H04B 10/07; H04B 10/0791; H04J 14/0282; H04J 3/14; H04J 3/1694
USPC ............................ 398/10, 14, 15, 17, 27, 38
See application file for complete search history.

(56) References Cited

U.S. PATENT DOCUMENTS

| | | | | |
|---|---|---|---|---|
| 8,064,764 B2* | 11/2011 | O'Byrne | ............ | H04B 10/0793 398/15 |
| 8,442,398 B2* | 5/2013 | Li | ............ | H04B 10/0795 398/16 |
| 8,532,482 B2* | 9/2013 | Yang | ............ | H04B 10/0791 398/10 |
| 8,649,679 B2* | 2/2014 | Shrikhande | ............ | H04J 3/14 398/10 |
| 9,496,952 B2* | 11/2016 | Bernard | ............ | H04B 10/038 |
| 9,515,725 B2* | 12/2016 | Bernard | ............ | H04B 10/038 |
| 9,680,568 B2* | 6/2017 | Smith | ............ | H04B 10/0705 |
| 2007/0143645 A1* | 6/2007 | Haran | ............ | H04B 10/077 714/704 |
| 2009/0010643 A1* | 1/2009 | DeLew | ............ | H04B 10/035 398/17 |
| 2012/0163808 A1* | 6/2012 | Kim | ............ | H04Q 11/0067 398/30 |
| 2016/0269811 A1* | 9/2016 | Chang | ............ | H04Q 11/0067 |

FOREIGN PATENT DOCUMENTS

| | | |
|---|---|---|
| CN | 103312409 A | 9/2013 |
| CN | 103597759 A | 2/2014 |
| CN | 103843269 A | 6/2014 |
| CN | 103888185 A | 6/2014 |
| JP | 2008-104028 A | 5/2008 |
| JP | 2010068362 A | 3/2010 |
| JP | 2011-87121 A | 4/2011 |
| JP | 2012-29176 A | 2/2012 |
| WO | WO-2011/027725 A1 | 3/2011 |

\* cited by examiner

METHOD AND APPARATUS FOR DETERMINING A ROGUE ONU IN A PON

CROSS-REFERENCE TO RELATED APPLICATIONS

This application is the U.S. National Phase application of PCT Application No. PCT/IB2015/001547 filed on Aug. 3, 2015, which claims priority to Chinese Patent Application No. 201410403806.5 filed on Aug. 15, 2014, the entire contents of each of which are incorporated herein by reference.

FIELD OF THE PRESENT INVENTION

The present invention relates to a passive optical network, and particularly to a method and apparatus for determining a rogue ONU in a PON.

BACKGROUND OF THE PRESENT INVENTION

The Time Division Multiplexing (TDM) based Passive Optical Network (PON) system had been world widely deployed because it is the most cost-effective way to implement fiber to home service. However, rouge Optical Network Unit (ONU) may lead part (or whole) of PON network service broken.

For the design of a TDM PON, the Optical Line Terminal (OLT) talks to OUNs in a broadcast manner over the downstream wavelength on optical fiber. And each ONU talks to the OLT within a given time slot allocated by the OLT over upstream wavelength (normally, upstream and downstream wavelength is different on the same trunk fiber). If a rogue ONU intentionally or unintentionally transmits optical signals to the OLT in the time slot which is allocated to other ONUs, the upstream service transmitted by other ONUs over this trunk fiber will be disturbed seriously.

"Rogue ONU" typically refers to an ONU which is transmitting in a manner not consistent with parameters specified in the standard. In the actual PON, it is an important issue to be solved, as the rogue ONU prevents the normal communications between the ONUs and the OLT. The rogue behavior of the rogue ONU can be caused by many reasons such as MAC error, software error, transmitter error, and so on. The most common case happens both in the TDM-PON and in the TWDM-PON is that the rogue ONU transmits its upstream signal in wrong time slots, as shown in FIG. 1. Normally, the failed transmitter turns on ahead of schedule because of the software or hardware error; or it turns off later than the schedule because of the component aging or other reasons. Therefore, the upstream bursts from other ONUs which are adjacent to the rogue ONU will be disturbed and cannot be received correctly by the OLT. However, determining a rogue ONU can be difficult since the affected ONUs are not always the ONUs which cause the disturbance.

In ITU and CCSA, typically there are several solutions to determine a rogue ONU.

Solution 1: powering off/on each ONU one by one till a rogue ONU is determined. However, this solution has the following disadvantages: 1) It is a time-consuming process since the OLT needs to check each ONUs' status one by one; 2) During the process of rogue ONU determination, the normal communication between the ONUs and the OLT may be interrupted, a long-time service interruption is unacceptable to the users; 3) Most Rogue ONUs are not always in rogue status and they may come back in a normal status after power/laser reset or fiber pull/plug; 4) This solution cannot guarantee the high reliability of a PON system.

Solution 2: calculating the error rate and link broken times for each ONU and recording the Dynamic Bandwidth Allocation (DBA) history in the OLT. Based on the DBA history, ONUs (with high error rate), which are impacted by adjacent rogue ONU, could be found out. In theory, all impacted normal ONUs should be disturbed by the same rogue ONU (with low error rate). By this way, the rogue ONU which is adjacent to and impact those normal ONU's (with high error rate) can be located. But this solution is not so pragmatic, because most OLTs of a PON do not record its DBA history and the adjacent information of the time slot is not available.

Therefore, design a solution in a practical system for identifying the rogue ONU quickly and remotely without service interruption is very beneficial.

SUMMARY OF THE PRESENT INVENTION

Based on the above considerations, the present application provides a method and apparatus for determining a rogue ONU in a PON.

According to a first aspect of the present application, there is provided a method for determining a rogue ONU in an OLT of a PON, the OLT receiving uplink signals of multiple ONUs, the method comprising the steps of: D. determining an original infected zone based on a first time slot allocation in which each time slot corresponds to an uplink signal of one ONU; B. determining a new infected zone based on a second time slot allocation in which each time slot corresponds to an uplink signal of one ONU; F. determining if there is a same ONU in the original infected zone and the new infected zone to determine a rogue ONU candidate; and G. determining rogue ONU based on the rogue ONU candidate.

Advantageously, the method further comprises step A before the step D, the step A comprises: determining that a first condition is satisfied based on a current time slot allocation, the first condition being whether an uplink error rate of any ONU controlled by the OLT is larger than an error rate threshold; if the first condition is satisfied, determining whether a second condition is satisfied, the second condition being whether a difference value between an optical power value and respective historical optical power value of an uplink signal of every ONU is larger than a pre-defined optical power threshold.

Advantageously, after the step A, the method further comprises step B, the step B comprises: determining an ONU which corresponds to a difference value larger than a predefined optical power threshold as a first source ONU, when the second condition is satisfied; not determining an ONU which corresponds to a difference value as a first source ONU, when the second condition is not satisfied.

Advantageously, after the step B, the method further comprises determining the first source ONU and an ONU which corresponds to adjacent time slots of a time slot of the first source ONU in the first time slot allocation as the original infected zone.

Advantageously, the step E comprises: E1. changing the first time slot allocation to generate the second time slot allocation, and informing every ONU of the second time slot allocation.

Advantageously, the method further comprises performing step A and step B after the step E1.

Advantageously, the step E further comprises: determining an ONU which corresponds to a difference value larger than a predefined optical power threshold as a second source ONU, when the second condition is satisfied; not determining an ONU which corresponds to a difference value as a second source ONU, when the second condition is not satisfied.

Advantageously, the step E further comprises: determining the second source ONU and an ONU which corresponds to adjacent time slots of a time slot of the second source ONU in the second time slot allocation as the new infected zone.

Advantageously, the step F further comprises determining whether there is a same ONU between the original infected zone and the new infected zone: if yes, determining a same ONU in the original infected zone and in the new infected zone as a rogue ONU candidate; if no, performing the step E again.

Advantageously, the step G comprises closing in turn the rogue ONU candidates and checking error rates of other ONUs except the closed ONU; if all error rates of the other ONUs are not larger than the error rate threshold, determining the closed rouge ONU candidate as the rouge ONU.

According to a second aspect of the present application, there is provided an apparatus for determining a rogue ONU in an OLT of a PON, the OLT receiving uplink signals of multiple ONUs, the apparatus comprising: an original infected zone determination unit for determining an original infected zone based on a first time slot allocation in which each time slot corresponds to an uplink signal of one ONU; a second time slot determination unit for changing the first time slot allocation to generate a second time slot allocation, and informing each ONU of the second time slot allocation; a new infected zone determination unit for determining a new infected zone based on a second time slot allocation in which every time slot corresponds to an uplink signal of one ONU; a determination unit for determining if there is a same ONU in the original infected zone and in the new infected zone to determine a rogue ONU candidate; and an ONU determination unit for determining a rogue ONU based on the rogue ONU candidate.

Advantageously, the apparatus further comprises: a first condition determination unit for determining whether the first condition is satisfied based on a current time slot allocation, the first condition being whether an uplink error rate of any ONU controlled by the OLT is larger than an error rate threshold; a second condition determination unit for determining whether a second condition is satisfied if the first condition is satisfied, the second condition being whether a difference value between an optical power value and respective historical optical power value of an uplink signal of every ONU is larger than a pre-defined optical power threshold.

Advantageously, the original infected zone determination unit further comprises: determining an ONU which corresponds to a difference value larger than a predefined optical power threshold as a first source ONU, when the second condition is satisfied; not determining an ONU which corresponds to a difference value as a first source ONU, when the second condition is not satisfied.

Advantageously, the original infected zone determination unit further comprises determining the first source ONU and an ONU which corresponds to adjacent time slots of a time slot of the first source ONU in the first time slot allocation as the original infected zone.

Advantageously, the new infected zone determination unit further comprises: determining an ONU which corresponds to a difference value larger than a predefined optical power threshold as a second source ONU when the second condition is satisfied; not determining an ONU which corresponds to a difference value as a second source ONU when the second condition is not satisfied.

Advantageously, the new infected zone determination unit further comprises determining the second source ONU and an ONU which corresponds to adjacent time slots of a time slot of the second source ONU in the second time slot allocation as the new infected zone.

Advantageously, the determination unit further comprises determining whether there is a same ONU in the original infected zone and in the new infected zone: if yes, determining a same ONU in the original infected zone and the new infected zone as a rogue ONU candidate.

Advantageously, the ONU determination unit comprises closing in turn the rogue ONU candidates and checking error rates of other ONUs except the closed ONU; if all error rates of the other ONUs are not larger than the error rate threshold, determining the closed rouge ONU candidate as the rouge ONU.

The present application involves a method and apparatus for determining a rouge ONU in a PON, and it has the following advantages:

1. Short determination time: number of candidate ONUs is largely reduced, therefore the determination process can be greatly simplified.

2. No service interruption for normal ONUs: the DBA changing process is automatically startup once an infected zone is determined. This process will not interrupt the communications between the OLT and other normal ONUs.

3. Compatibility: the solution of the present application can be used not only in a TDM-PON system but also in a TWDM-PON (NG-PON2) system.

4. All data analysis can be done offline even the rogue ONU comes back to normal after reset.

5. The solution of the present application can handle the rogue ONU which comes back to normal after reset.

Various aspects of the present application will become more apparent through the description of embodiments hereinafter.

BRIEF DESCRIPTION OF THE DRAWINGS

The other features, objectives and advantages of the present invention will be better understood via the preferable embodiments described in detail herein below with reference to the accompanying drawings.

In the figures, the same or similar reference number indicates the same or similar component or feature.

DETAILED DESCRIPTION OF THE PREFERRED EMBODIMENTS

In detailed description of the preferred embodiment hereafter, appended figures, as part of the present application, will be referred. The appended drawings illustrate the specific embodiments to carry out the present application through exemplary manner. Exemplary embodiments are not intended to exhaust all embodiments of the present application. It needs to clarify that, although steps associated with corresponding method in the present application is described in a specific order in accompanying drawings, it does not requires or suggests that those operations must be performed accordance with the specific order, or all the illustrated operations must be performed in order to achieve the desired results, in contrast, the order described in the present application can be changed. Additionally or alternatively, some steps may be omitted, multiple steps may be combined into one step, and/or one step may be decomposed into several steps.

The solution for determining a rogue ONU, as proposed in the present application, is based on two considerations: (1) Once an ONU is failed or its upstream burst collides with other ONUs' upstream bursts, "packet loss" will happen in an OLT side, which means the "BER" of the upstream burst will be significantly increased. (2) If the "packet loss" is caused by a time slot collision, the optical power of the affected ONUs will be superposed with the optical power of the rogue ONU. So that the received optical power of the affected ONU will be significantly increased compared to its historical optical power. Based on above two considerations, the ONUs which are affected by a rogue ONU can be identified.

Figure 1:
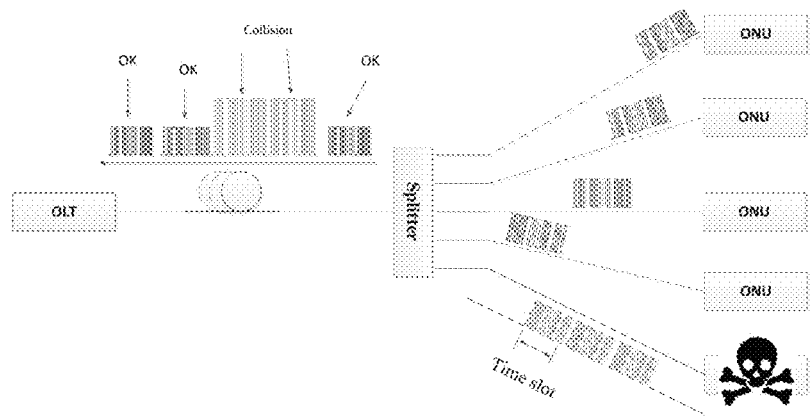
FIG. 1 illustrates a schematic view of a typical scenario of a rouge ONU behavior in a PON system.
Figure 2:
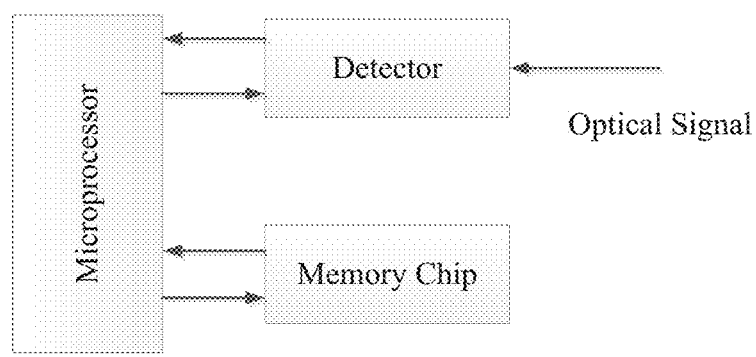
FIG. 2 illustrates a schematic view of embedded memory chip in an OLT according to an embodiment of the invention.

The technical solution of the present application, which is different from the existing one-by-one checking solution, introduces two decision conditions, i.e. the "packet loss" (or "BER"), and the received optical power in the OLT. Since the decision threshold changes according to the different peak amplitudes of the received uplink packets, in this invention the decision threshold is extracted from the historical received optical power of each ONU. FIG. 2 illustrates a schematic view of embedded memory chip in an OLT according to an embodiment of the invention, wherein a memory chip records historical error rates and error rate threshold of each ONU, the micro-processor determines the error rate threshold based on the historical error rates. Similarly, a memory chip records the historical optical power value and optical power threshold of each ONU. Those skilled in the art should appreciate that there are many ways to determine optical power threshold and error rate threshold, for example, averaging based on historical values etc., those are not listed in the present application.

Figure 3:
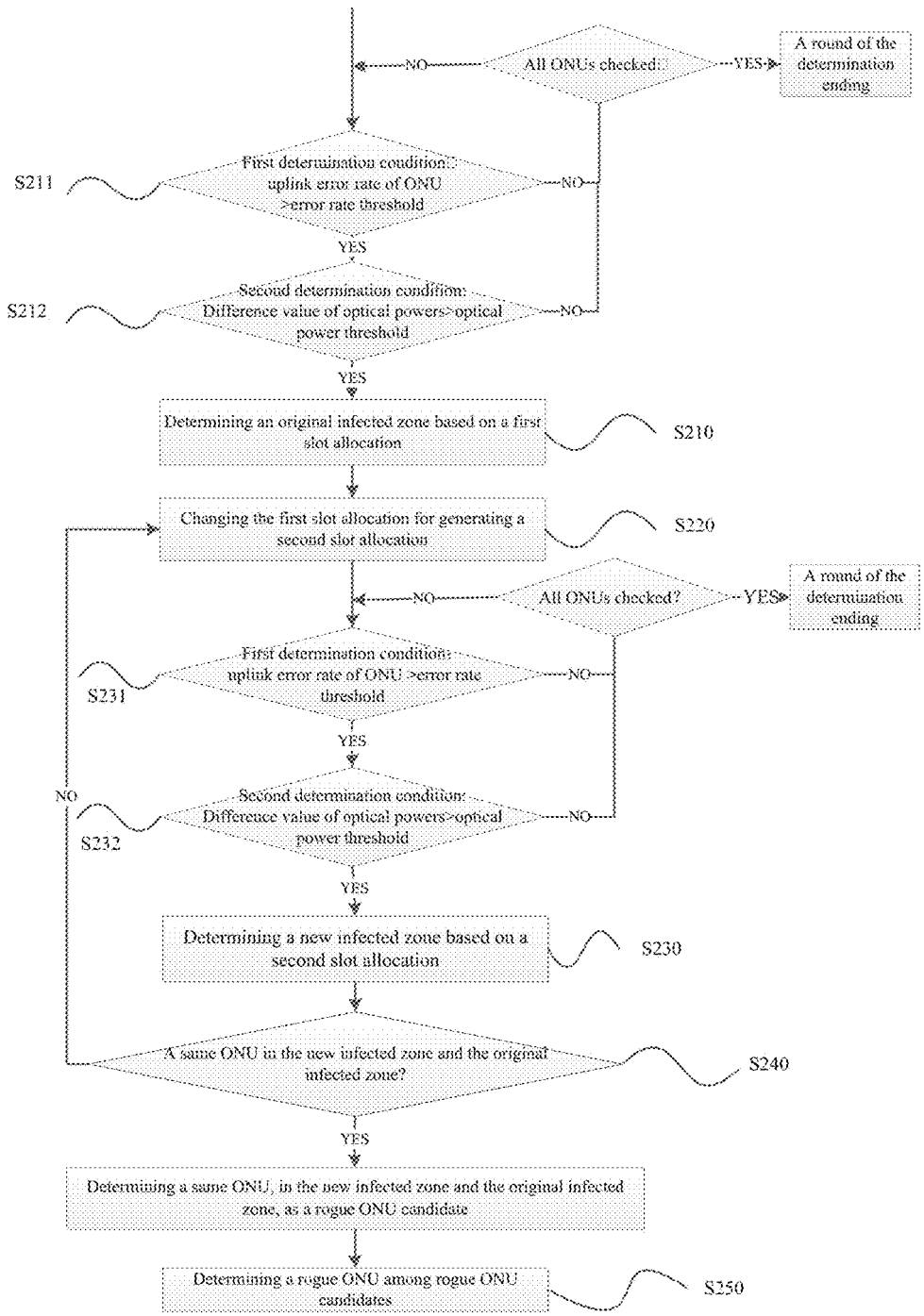
FIG. 3 illustrates a flow chart of a method for determining a rogue ONU according to an embodiment of the invention.

FIG. 3 illustrates a flow chart of a method for determining a rogue ONU according to an embodiment of the invention, wherein the OLT in the PON controls multiple ONUs.

In step S210, the OLT determines an original infected zone based on a first time slot allocation in which each time slot corresponds to an uplink signal of one ONU.

Firstly, in step S211, the OLT determines whether a first condition is satisfied based on a current time slot allocation, the first condition is that an uplink error rate of an ONU controlled by the OLT is larger than an error rate threshold.

If an uplink error rate of the ONU controlled by the OLT is not larger than the error rate threshold, the OLT continuously determines whether an uplink error rate of other ONU controlled by the OLT is larger than the error rate threshold, this round of the determination is ended until the uplink error rates of all ONUs controlled by the OLT are checked.

If the first condition is satisfied, i.e., an uplink error rate of an ONU controlled by the OLT is larger than an error rate threshold, in step S212, the OLT determines whether a second condition is satisfied, the second condition is that a difference value between an optical power value and respective historical optical power value of an uplink signal of every ONU is larger than a pre-defined optical power threshold.

When the second condition is not satisfied, i.e., the difference value between an optical power value and respective historical optical power value of an uplink signal of an ONU is not larger than a pre-defined optical power threshold, the OLT does not determine an ONU which corresponds to a difference value as a first source ONU. And the OLT continuously determines whether an uplink error rate of other ONU controlled by the OLT is larger than the error rate threshold, this round of the determination is ended until the uplink error rates of all ONUs controlled by the OLT are checked.

When the second condition is satisfied, i.e., the difference value between an optical power value and respective historical optical power value of an uplink signal of an ONU is larger than a pre-defined optical power threshold, the OLT determines an ONU which corresponds to a difference value larger than the predefined optical power threshold as a first source ONU.

After the step 212, the OLT determines that the first source ONU and an ONU which corresponds to adjacent time slots of a time slot of the first source ONU in the first time slot allocation as the original infected zone.

Figure 4:
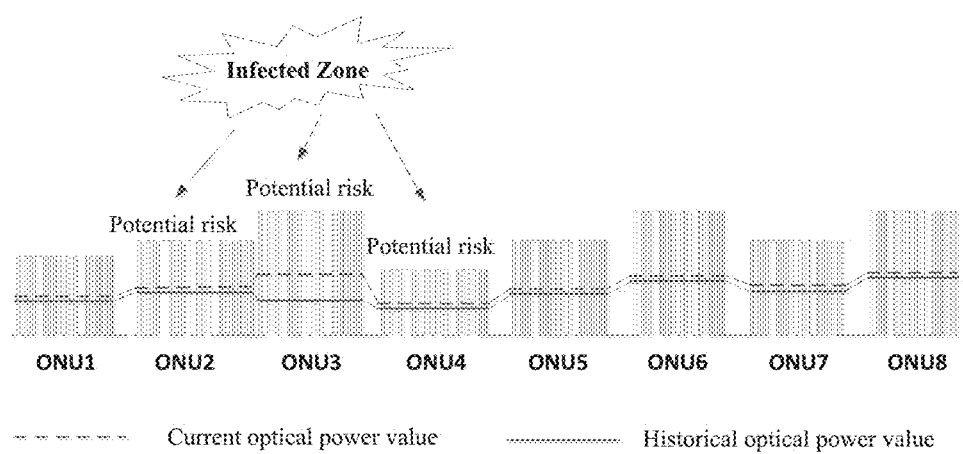
FIG. 4 illustrates a schematic view of an infected zone according to an embodiment of the invention.

As illustrated in FIG. 4, for example, the ONU3 satisfies the first condition and the second condition simultaneously. The OLT marks the ONU3 as a first source ONU. Meanwhile, the OLT also marks ONU2 and ONU4 whose time slot are adjacent to the time slot of ONU3. Thus, ONU2, ONU3 and ONU4 compose an original infected zone. Every ONU in the original infected zone has potential risk to be a rogue ONU.

The skilled art should appreciate that "adjacent" in the present application is not limited to the ONUs at both sides of the first source ONU which satisfies the first condition and the second condition simultaneously. That is, in a needed basis, the original infected zone can be determined as ONU1, ONU2, ONU3 and ONU5.

After determination of the original infected zone, in step S220, the OLT changes the first time slot allocation to generate a second time slot allocation, and informing every ONU of the second time slot allocation, wherein the second time slot allocation is different from the first time slot allocation.

In step S230, the OLT determines a new infected zone based on the second time slot allocation in which each time slot corresponds to an uplink signal of one ONU.

Firstly, in step S231, the OLT determines whether the first condition is satisfied based on a current time slot allocation, the first condition is that an uplink error rate of an ONU controlled by the OLT is larger than an error rate threshold.

If an uplink error rate of an ONU controlled by the OLT is not larger than an error rate threshold, the OLT continuously determines whether an uplink error rate of other ONU controlled by the OLT is larger than the error rate threshold, this round of the determination is ended until the uplink error rates of all ONUs controlled by the OLT are checked.

If the first condition is satisfied, i.e., an uplink error rate of an ONU controlled by the OLT is larger than an error rate threshold, in step S232, the OLT determines whether the second condition is satisfied, the second condition is that a difference value between an optical power value and respective historical optical power value of an uplink signal of every ONU is larger than a pre-defined optical power threshold.

When the second condition is not satisfied, i.e., the difference value between an optical power value of an uplink signal and respective historical optical power value is not larger than a pre-defined optical power threshold, the OLT does not determine an ONU which corresponds to a difference value as a second source ONU. And the OLT continuously determines whether an uplink error rate of other ONU controlled by the OLT is larger than the error rate threshold, this round of the determination is ended until the uplink error rates of all ONUs controlled by the OLT are checked.

When the second condition is satisfied, i.e., the difference between an optical power value of an uplink signal and respective historical optical power value is larger than a pre-defined optical power threshold, the OLT determines an ONU which corresponds to a difference value larger than the predefined optical power threshold as a second source ONU.

After step S212, the OLT determines the second source ONU and the ONU which corresponds to adjacent time slots of a time slot of the second source ONU in the second time slot allocation as the new infected zone.

Figure 5:
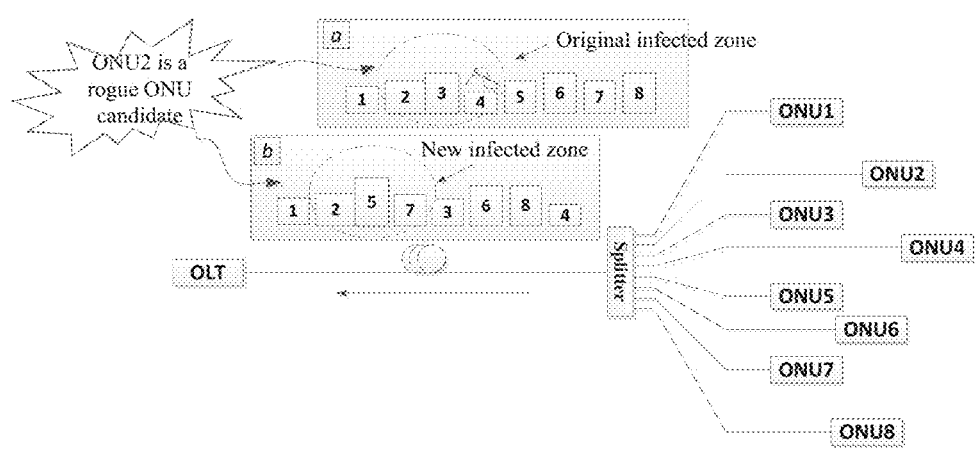
FIG. 5 illustrates a schematic view of determining a rouge ONU via changing DBA according to an embodiment of the invention.

As illustrated in FIG. 5, according to the second time slot allocation, for example, ONU5 satisfies the first condition and the second condition simultaneously, thus the OLT marks the ONU5 as the a second source ONU. Meanwhile, the OLT also marks ONU2 and ONU7 whose time slots are adjacent to the time slot of ONU5 as a rogue ONU. Thus, ONU2, ONU5 and ONU7 compose a new infected zone. Every ONU in the original infected zone has potential risk to be a rogue ONU.

In step S240, the OLT determines whether there is a same ONU in the original infected zone and in the new infected zone in order to determine a rogue ONU candidate.

If there is a same ONU in the original infected zone and in the new infected zone, the OLT determines the same ONU in the original infected zone and in the new infected zone as a rogue ONU candidate. For example, as shown in Table 1, ONU2 appears both in the original infected zone and in the new infected zone, ONU2 is determined as the rogue ONU candidate.

TABLE 1

Determination of a rogue ONU

| | Infected zone | | | | |
|---|---|---|---|---|---|
| Original infected zone | ONU2 | ONU3 | ONU4 | | |
| New infected zone | ONU2 | | | ONU5 | ONU7 |
| Number of Occurrence | Twice | Once | Once | Once | Once |
| Determination | Rogue ONU candidate | exclusion | exclusion | exclusion | exclusion |

The skilled in the art should appreciate that, though number of occurrence of 2 in Table 1 is defined as the condition for determination of a rogue ONU, based on the practical situation, other number of occurrence, which is larger than 1, is not excluded to determine a rogue ONU.

If there is no same ONU in the original infected zone and in the new infected zone, step S220 to step S240 are performed again, i.e., the OLT changes the first time slot allocation again to generate a time slot allocation, which is different from the first time slot allocation and the second time slot allocation, for determining a rogue ONU.

In step S250, the rogue ONU is determined among rogue ONU candidates. OLT closes rogue ONU candidates in turn and checks the error rates of other ONUs except the closed ONU, if all error rates of the other ONUs are smaller than or equal to the error rate threshold, the closed rouge ONU candidate is determined as the rouge ONU.

Figure 6:
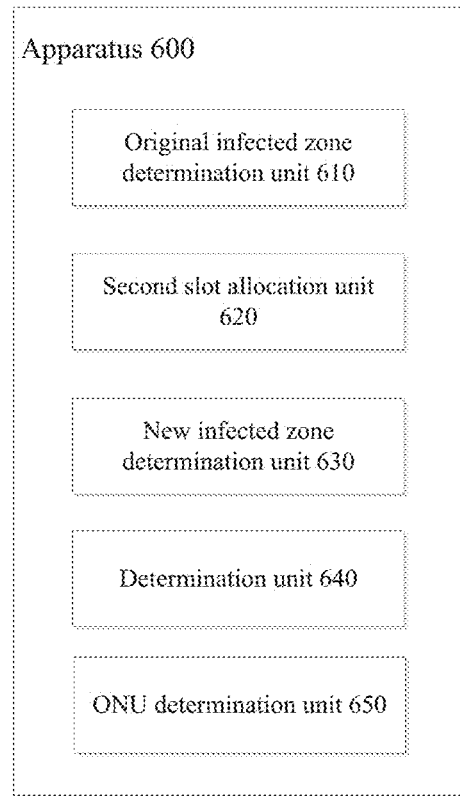
FIG. 6 illustrates a schematic view of an apparatus for determining a rogue ONU in a PON.

FIG. 6 illustrates a schematic view of an apparatus for determining a rogue ONU in a PON. The apparatus 600 may be or may implement OLT in the embodiment described in the aforementioned description in conjunction with FIGS. 2-5.

As illustrated in FIG. 6, the apparatus 600 comprises an original infected zone determination unit 610 for determining an original infected zone based on a first time slot allocation in which each time slot corresponds to an uplink signal of one ONU; a second time slot determination unit 620 for changing the first time slot allocation to generate a second time slot allocation, and informing every ONU of the second time slot allocation; a new infected zone determination unit 630 for determining a new infected zone based on a second time slot allocation in which each time slot corresponds to an uplink signal of one ONU; a determination unit 640 for determining if there is a same ONU in the original infected zone and the new infected zone to determine a rogue ONU candidate; and an ONU determination unit 650 for determining a rogue ONU based on the rogue ONU candidate.

The apparatus 600 further comprises a first condition determination unit for determining whether the first condition is satisfied based on a current time slot allocation, the first condition is that an uplink error rate of any ONU controlled by the OLT is larger than an error rate threshold; a second condition determination unit for determining whether a second condition is satisfied if the first condition is satisfied, the second condition is that a difference between an optical power value of an uplink signal of every ONU and respective historical optical power value is larger than a pre-defined optical power threshold.

When the second condition is satisfied, the apparatus 600 determines an ONU which corresponds to a difference value larger than a predefined optical power threshold as a first source ONU; when the second condition is not satisfied, the apparatus 600 does not determines an ONU which corresponds to a difference value as a first source ONU.

The original infected zone determination unit 610 further comprises determining the first source ONU and an ONU which corresponds to adjacent time slots of a time slot of the first source ONU in the first time slot allocation as the original infected zone.

The new infected zone determination unit 630 further comprises determining an ONU which corresponds to a difference value larger than a predefined optical power threshold as a second source ONU when the second condition is satisfied; not determining an ONU which corresponds to a difference value as a second source ONU when the second condition is not satisfied.

The new infected zone determination unit 630 further comprises determining the second source ONU and ONU which corresponds to adjacent time slots of a time slot of the second source ONU in the second time slot allocation as the new infected zone.

The determination unit 640 further comprises determining whether there is a same ONU in the original infected zone and in the new infected zone: if yes, determining a same ONU in the original infected zone and the new infected zone as a rogue ONU candidate.

The ONU determination unit 650 comprises closing in turn the rogue ONU candidates and checking error rate of other ONU except the closed ONU; if all error rates of the other ONUs are not larger than the error rate threshold, determining the closed rouge ONU candidate as the rouge ONU.

For those ordinarily skilled in the art, the embodiments of the invention have been described above, but the invention will not be limited to any specific system, device or particular protocol, and those skilled in the art can make various modifications or variations without departing from the scope of the appended claims. In the claims, the term "comprising" will not preclude another element(s) and step(s), and the term "a" or "an" will not preclude plural. In the apparatus claims, one element can perform functions of a plurality of technical features as referred to in the claims. In the invention, "first", "second", etc., merely designate a name but will not suggest any sequential relationship.

The invention claimed is:

1. A method for determining a rogue ONU in an OLT of a passive optical network, the OLT receiving uplink signals of multiple ONUs, the method comprising the steps of:
   (A). detecting, by at least one first processor of the OLT, a rogue ONU condition using an uplink error rate and an optical power value, if the rogue ONU condition is detected then,
   (D). determining, by the least one first processor, an original infected zone based on a first time slot allocation in which each time slot corresponds to an uplink signal of one ONU;
   (B). determining, by the least one first processor, a new infected zone based on a second time slot allocation in which each time slot corresponds to an uplink signal of one ONU;
   (F). determining, by the least one first processor, if there is a same ONU in the original infected zone and in the new infected zone to determine a rogue ONU candidate; and
   (G). determining, by the least one first processor, a rogue ONU based on the rogue ONU candidate.

2. The method according to claim 1, wherein the rogue ONU condition is further detected by,
   determining whether a first rogue ONU condition is satisfied based on a current time slot allocation, the first rogue ONU condition being whether the uplink error rate of any ONU controlled by the OLT is larger than an error rate threshold;
   if the first rogue ONU condition is satisfied, determining whether a second rogue ONU condition is satisfied, the second rogue ONU condition being whether a difference value between the optical power value and respective historical optical power value of an uplink signal of each ONU is larger than a pre-defined optical power threshold.

3. The method according to claim 2, wherein the step (B) occurs after the step (A), step B further including,
   determining an ONU which corresponds to a difference value larger than a predefined optical power threshold as a first source ONU, when the second rogue ONU condition is satisfied;
   not determining an ONU which corresponds to a difference value as a first source ONU, when the second rogue ONU condition is not satisfied.

4. The method according to claim 3, wherein the method further comprises after the step (B): determining the first source ONU and an ONU which corresponds to adjacent time slots of a time slot of the first source ONU in the first time slot allocation as the original infected zone.

5. The method according to claim 1, further comprising a step (E), the step (E) including,
   (E1). changing the first time slot allocation to generate the second time slot allocation, and informing every ONU of the second time slot allocation.

6. The method according to claim 5, wherein the step (A) and the step (B) occurs after the step (E1).

7. The method according to claim 6, wherein the step (E) includes,
   determining an ONU which corresponds to a difference value larger than a predefined optical power threshold as a second source ONU when the second rogue ONU condition is satisfied;
   not determining an ONU which corresponds to a difference value as a second source ONU, when the second rogue ONU condition is not satisfied.

8. The method according to claim 7, wherein the step (E) further includes,
   determining the second source ONU and an ONU which corresponds to adjacent time slots of a time slot of the second source ONU in the second time slot allocation as the new infected zone.

9. The method according to claim 1, wherein the step (F) further comprises determining whether there is a same ONU in the original infected zone and in the new infected zone:
   if yes, determining a same ONU in the original infected zone and in the new infected zone as a rogue ONU candidate;
   if no, performing the step (E) again.

10. The method according to claim 1, wherein the step (G) comprises:
    closing in turn the rogue ONU candidate and checking error rates of other ONUs except the closed ONU; if all error rates of the other ONU are not larger than the error rate threshold, determining the closed rouge ONU candidate as the rouge ONU.

11. An apparatus for determining a rogue ONU in an OLT of a PON, the OLT receiving uplink signals of multiple ONUs, the apparatus comprising:
    a first and second condition determination unit detecting a rogue ONU condition using an uplink error rate and an optical power value,
    an original infected zone determination unit for determining an original infected zone based on a first time slot allocation in which each time slot corresponds to an uplink signal of one ONU, if the first and second condition determination unit detect the rogue ONU condition;
    a second time slot determination unit for changing the first time slot allocation to generate a second time slot allocation, and informing each ONU of the second time slot allocation;
    a new infected zone determination unit for determining a new infected zone based on a second time slot allocation in which each time slot corresponds to an uplink signal of one ONU;
    a determination unit for determining if there is a same ONU in the original infected zone and in the new infected zone to determine a rogue ONU candidate; and
    an ONU determination unit for determining a rogue ONU based on the rogue ONU candidate.

12. The apparatus according to claim 11, wherein the first and second condition determination unit further detects the rogue ONU condition by,
    the first condition determination unit for determining whether a first rogue ONU condition is satisfied based on a current time slot allocation, the first rogue ONU condition being whether an uplink error rate of any ONU controlled by the OLT is larger than an error rate threshold;

the second condition determination unit determining whether a second rogue ONU condition is satisfied if the first rogue ONU condition is satisfied, the second rogue ONU condition being whether a difference value between an optical power value and respective historical optical power value of an uplink signal of every ONU is larger than a pre-defined optical power threshold.

13. The apparatus according to claim 12, wherein the original infected zone determination unit further comprises:
   determining an ONU which corresponds to a difference value larger than a predefined optical power threshold as a first source ONU, when the second rogue ONU condition is satisfied;
   not determining an ONU which corresponds to a difference value as a first source ONU, when the second rogue ONU condition is not satisfied.

14. The apparatus according to claim 13, wherein the original infected zone determination unit further comprises determining the first source ONU and an ONU which corresponds to adjacent time slots of a time slot of the first source ONU in the first time slot allocation as the original infected zone.

15. The apparatus according to claim 11, wherein the new infected zone determination unit further comprises:
   determining an ONU which corresponds to a difference value larger than a predefined optical power threshold as a second source ONU when the second rogue ONU condition is satisfied;
   not determining an ONU which corresponds to a difference value as a second source ONU when the second rogue ONU condition is not satisfied;
   determining the second source ONU and an ONU which corresponds to adjacent time slots of a time slot of the second source ONU in the second time slot allocation as the new infected zone.

\* \* \* \* \*